(12) United States Patent
Srivastav et al.

(10) Patent No.: US 10,162,843 B1
(45) Date of Patent: Dec. 25, 2018

(54) DISTRIBUTED METADATA MANAGEMENT

(71) Applicant: EMC Corporation, Hopkinton, MA (US)

(72) Inventors: Shashwat Srivastav, Seattle, WA (US); Sriram Sankaran, Redmond, WA (US); Qi Zhang, Redmond, WA (US); Jun Luo, Bellevue, WA (US); Liang Mei, Bellevue, WA (US); Peter M. Musial, Arlington, MA (US); Andrew D. Robertson, Washington, DC (US); Huapeng Yuan, Seattle, WA (US); Igor A. Medvedev, Seattle, WA (US); Jie Song, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 40 days.

(21) Appl. No.: 14/319,360

(22) Filed: Jun. 30, 2014

Related U.S. Application Data

(60) Provisional application No. 61/988,603, filed on May 5, 2014, provisional application No. 61/988,796, filed on May 5, 2014.

(51) Int. Cl.
*G06F 12/00* (2006.01)
*G06F 13/00* (2006.01)
(Continued)

(52) U.S. Cl.
CPC ........ *G06F 17/30327* (2013.01); *G06F 3/067* (2013.01); *G06F 17/30091* (2013.01)

(58) Field of Classification Search
CPC .... G06F 3/0638; G06F 3/0643; G06F 3/0644; G06F 3/067; G06F 11/10; G06F 11/1076; G06F 11/108; G06F 11/1435; G06F 17/30067; G06F 17/30091; G06F 17/30094; G06F 17/30097; G06F 17/301; G06F 17/30197; G06F 17/3012; G06F 17/30327; G06F 17/3033; G06F 17/30333; G06F 17/30336; G06F 17/30525;
(Continued)

(56) References Cited

U.S. PATENT DOCUMENTS 6,725,392 B1 * 4/2004 Frey .................... G06F 11/1076
714/15
6,782,389 B1 * 8/2004 Chrin ................ G06F 17/30067
(Continued)

OTHER PUBLICATIONS

Dynamic Metadata Management for Petabyte-Scale File Systems; Well et al.; SC '04 Proceedings of the 2004 ACM/IEEE conference on Supercomputing ; p. 4; Nov. 6-12, 2004 (Year: 2004).*

*Primary Examiner* — Daniel C Chappell
(74) *Attorney, Agent, or Firm* — Krishnendu Gupta; Konrad R. Lee

(57) ABSTRACT

A computer-executable method, computer program product and system for managing metadata in a distributed data storage system, wherein the distributed data storage system includes a first node and one or more data storage arrays, the computer-executable method, computer program product and system comprising partitioning management of metadata created in the distributed data storage system into one or more portions of metadata, wherein the first node manages a first portion of the one or more portions of metadata, and storing the metadata using the first node.

12 Claims, 15 Drawing Sheets

(51) Int. Cl.
*G06F 13/28* (2006.01)
*G06F 17/30* (2006.01)
*G06F 3/06* (2006.01)

(58) Field of Classification Search
CPC ......... G06F 17/30613; G06F 17/30619; G06F 17/30722; G06F 17/30997; G06F 2211/104
See application file for complete search history.

(56) References Cited

U.S. PATENT DOCUMENTS

| | | | | |
|---|---|---|---|---|
| 7,711,897 B1 * | 5/2010 | Chatterjee | ............ | G06F 3/0605 711/112 |
| 7,937,421 B2 * | 5/2011 | Mikesell | ............ | H04N 21/6125 707/825 |
| 7,962,779 B2 * | 6/2011 | Patel | ............ | G06F 11/1076 714/4.12 |
| 8,078,653 B1 * | 12/2011 | Bisson | ............ | G06F 17/30864 707/641 |
| 8,086,585 B1 * | 12/2011 | Brashers | ............ | G06F 17/30097 707/705 |
| 8,112,395 B2 * | 2/2012 | Patel | ............ | G06F 11/1076 707/636 |
| 8,510,279 B1 * | 8/2013 | Natanzon | ............ | G06F 17/30073 707/697 |
| 8,539,137 B1 * | 9/2013 | Protassov | ............ | G06F 3/0619 711/203 |
| 8,620,962 B1 * | 12/2013 | Strunk | ............ | G06F 17/30094 707/797 |
| 8,799,267 B2 * | 8/2014 | Milby | ............ | G06F 3/0613 707/713 |
| 9,002,860 B1 * | 4/2015 | Ghemawat | ............ | G06F 12/0284 707/755 |
| 9,058,112 B2 * | 6/2015 | Fang | ............ | G06F 3/0608 |
| 9,733,869 B1 * | 8/2017 | Fan | ............ | G06F 3/0665 |
| 9,971,526 B1 * | 5/2018 | Wei | ............ | G06F 3/0619 |
| 2010/0180153 A1 * | 7/2010 | Jernigan, IV | ............ | G06F 11/1076 714/6.12 |
| 2010/0235413 A1 * | 9/2010 | Patel | ............ | G06F 11/1076 707/825 |
| 2010/0250531 A1 * | 9/2010 | Andersen | ............ | G06Q 30/02 707/736 |
| 2012/0054500 A1 * | 3/2012 | Dhuse | ............ | H04L 9/085 713/189 |
| 2014/0013046 A1 * | 1/2014 | Corbett | ............ | G06F 12/00 711/112 |
| 2014/0310489 A1 * | 10/2014 | Chambliss | ............ | G06F 3/065 711/162 |

* cited by examiner

DISTRIBUTED METADATA MANAGEMENT

CROSS REFERENCE TO RELATED APPLICATIONS

This Application claims priority from U.S. Provisional Patent Application Serial Nos. 61/988,603 entitled "DISTRIBUTED DATA STORAGE MANAGEMENT" and 61/988,796 entitled "ZONE CONSISTENCY" filed on May 5, 2014 the content and teachings of which are hereby incorporated by reference in their entirety.

This Application is related to U.S. patent application Ser. No. 14/319,349 entitled "DISTRIBUTED DATA STORAGE MANAGEMENT", Ser. No. 14/319,368 entitled "SCALABLE DISTRIBUTED STORAGE SYSTEM INFRASTRUCTURE", Ser. No. 14/319,378 entitled "DISTRIBUTED DATA STORAGE MANAGEMENT", Ser. No. 14/319,383 entitled "DATA BACKUP MANAGEMENT ON DISTRIBUTED STORAGE SYSTEMS", Ser. No. 14/319,113 entitled "ZONE CONSISTENCY", and Ser. No. 14/319,117 entitled "ZONE CONSISTENCY" filed on even date herewith, the teachings of which applications are hereby incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, computer program product and system for managing metadata in a distributed data storage system, wherein the distributed data storage system includes a first node and one or more data storage arrays, the computer-executable method, computer program product and system comprising partitioning management of metadata created in the distributed data storage system into one or more portions of metadata, wherein the first node manages a first portion of the one or more portions of metadata, and storing the metadata using the first node.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
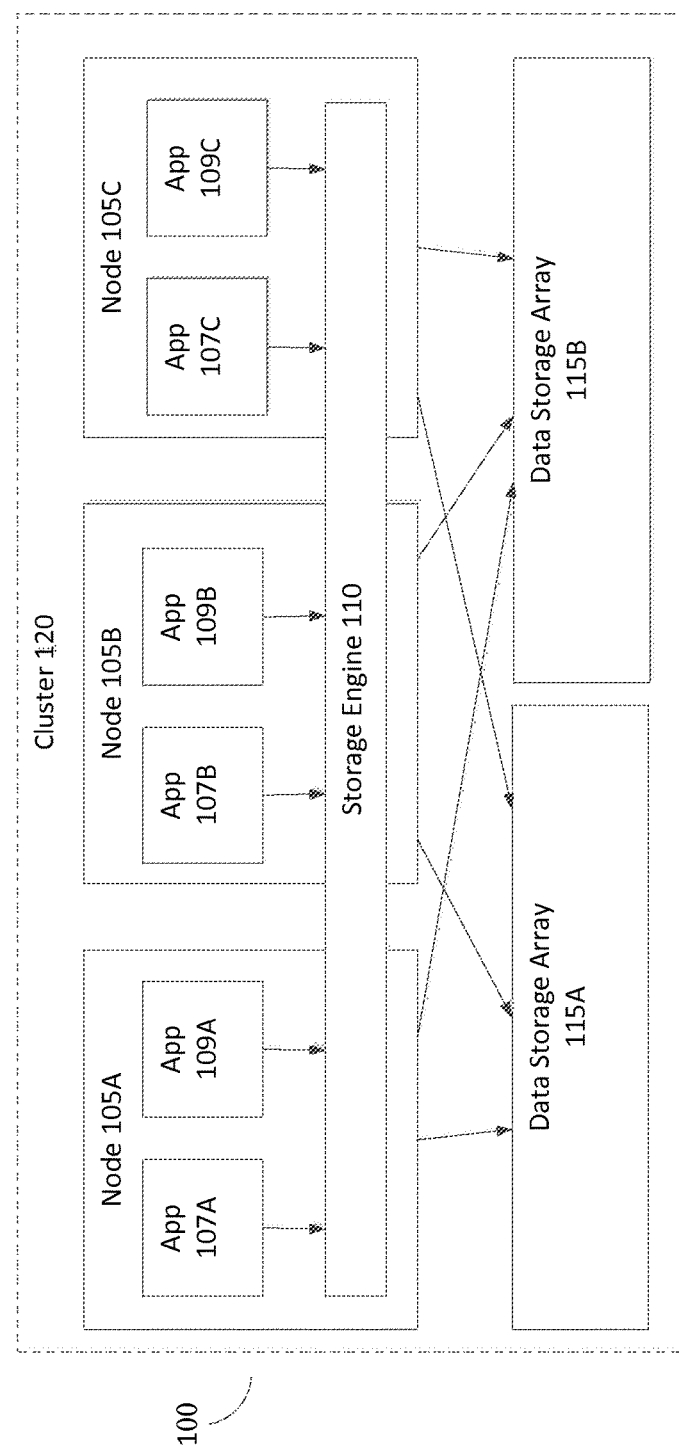
FIG. 1 is a simplified illustration of a distributed data storage system, in accordance with an embodiment of the present disclosure.

Traditionally, distributed data storage systems are managed by a single node and/or module within the distributed data storage system. Conventionally, control by a single node makes a distributed data storage system vulnerable to downtime due to node failure. Typically, control by a single node makes a distributed data storage system constrained by an ability of a single node to manage data I/O requests made within the distributed data storage system. Conventionally, improving the ability to manage data I/O requests within a distributed data storage system would be beneficial to the data storage system industry.

In many embodiments, the current disclosure may enable management of metadata in a distributed data storage system. In various embodiments, the current disclosure may enable an efficient distribution of metadata throughout a distributed data storage system. In most embodiments, the current disclosure may enable a distributed data storage system to shard metadata throughout the distributed data storage system. In some embodiments, the current disclosure may enable storage of metadata in partitions sharded throughout a distributed data storage system.

In many embodiments, a distributed data storage system may use a partitioning scheme to divide system responsibilities across nodes within the distributed data storage system. In various embodiments, a distributed data storage system may store metadata within a logical table. In certain embodiments, a logical table may be sharded into partitions distributed on nodes throughout a distributed data storage system. In some embodiments, sharding of a logical table may be implemented based on hashing of the logical table to ensure a random distribute of load. In most embodiments, a partition may be owned by one node at a given time, however, a node may own many partitions.

In various embodiments, a distributed data storage system may include one or more clusters and/or zones. In many embodiments, a cluster and/or zone may include one or more compute nodes and one or more data storage arrays. In certain embodiments, metadata of a cluster may be sharded throughout a cluster. In some embodiments, sharding metadata may include partitioning metadata into one or more partitions that may be enabled to be managed using the one or more compute nodes in a cluster and/or zone. In most embodiments, a compute node may manage one or more partitions of metadata. In various embodiments, a cluster may maintain information related to each created partition and/or each node associated with each partition. In some embodiments, each node within a cluster may maintain information related to location and/or ownership of each partition in a cluster.

In many embodiments, management of each portion of metadata within a distributed data storage system may change over time. In various embodiments, management of each portion of metadata within a distributed data storage system may dynamically change based on the load of each node management metadata within the distributed data storage system. In some embodiments, one or more nodes may manage multiple portions of metadata. In other embodiments, one or more nodes may manage a single portion of metadata. In certain embodiments, one or more nodes may not manage any metadata. In most embodiments, as the amount of metadata increases, management of partitions of metadata may be modified to increase efficiency of the distributed data storage system.

In many embodiments, metadata within a partition may include a table of key-values. In various embodiments, a node that owns a partition may execute the operations that are associated with keys in a partition associated with the node. In certain embodiments, key-value information may be persisted on chunks in a distributed data storage system using B-Tree and Journal.

In many embodiments, meta data may be stored within a distributed data storage system using a B-Tree structure. In various embodiments, a Btree may be a tree data structure that may keep data stored and/or allow searches, sequential access, insertions, and deletions in logarithmic time. In certain embodiments, a B-tree may be optimized for systems that read and write large blocks of data. In most embodiments, a B-tree implementation may include two portions including a B-tree itself and a journal of entries awaiting to update the B-tree. In various embodiments, a journal may includes entries which may update a b-tree by adding entries, modifying entries, and/or removing entries within the B-tree. In some embodiments, a distributed data storage system using a B-tree may periodically update and/or augment the B-tree and specified intervals and/or when journal data reaches a specified size.

Refer to the example embodiment of FIG. 1. FIG. 1 is a simplified illustration of a distributed data storage system, in accordance with an embodiment of the present disclosure. As shown, distributed data storage system 100 includes cluster 120 which includes Nodes (105A-C, 105 Generally), and Data Storage Arrays (115A-B, 115 Generally). Node 105A is in communication with data storage array 115A and Data storage Array 115B. Node 105B is in communication with data storage array 115A and 115B. Node 105C is in communication with data storage array 115A and Data storage Array 115B. In FIG. 1, storage engine 110 is executed on each node 105. storage engine 110 enables Applications 107A, 109A, 107B, 109B, 107C, 109C to execute data I/O requests to and from distributed data storage system 100. In various embodiments, a distributed data storage system may include one or more clusters which may be located in one or more locations.

Figure 2:
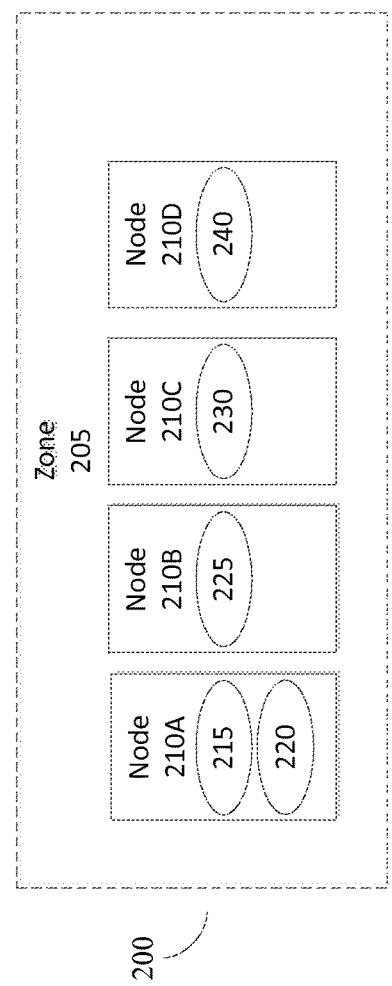
FIG. 2 is a simplified illustration of a zone within a distributed data storage system, in accordance with an embodiment of the present disclosure.

Refer to the example embodiment of FIG. 2. FIG. 2 is a simplified illustration of a zone within a distributed data storage system, in accordance with an embodiment of the present disclosure. As shown, distributed data storage system 200 includes zone 205. In various embodiments, a zone may include one or more clusters which may include one or more nodes in communication with one or more data storage arrays. In this embodiment, zone 205 includes node 210A, 210B, 210C, and 210D. Nodes 210 manage metadata stored within partitions 215, 220, 225, 230, 240. Node 210A manages partition 215 and partition 220. Node 210B manages partition 225. Node 210C manages partition 230. Node 210D manages partition 240. In many embodiments, a node may manage one or more partitions of metadata. In most embodiments, a partition may be managed by a single node. In various embodiments, if there is a node failure, any node within a zone may be enabled to support partitions managed by the failed node. In certain embodiments, each node within a zone may include a logical table with information related to which nodes manage which partitions. In some embodiments, a logical table of partition information may include where each of the partitions are stored within the zone.

Figure 3:
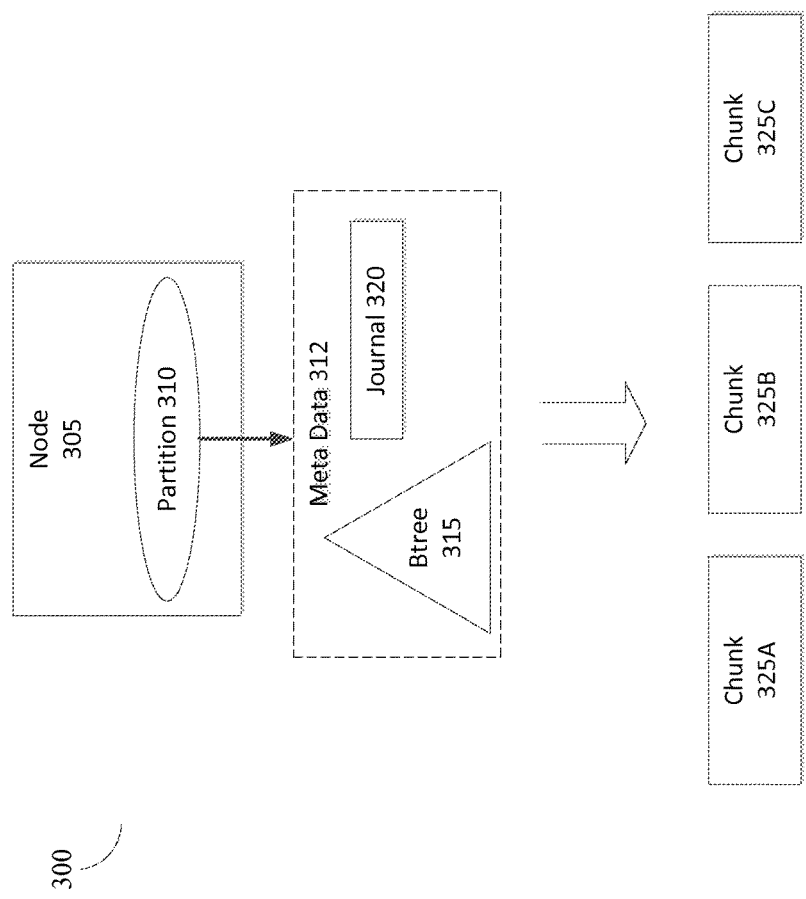
FIG. 3 is a simplified illustration of a partition stored in a distributed data storage system, in accordance with an embodiment of the present disclosure.

Refer to the example embodiment of FIG. 3. FIG. 3 is a simplified illustration of a partition stored in a distributed data storage system, in accordance with an embodiment of the present disclosure. As shown, Node 305 is part of distributed data storage system 300. Node 305 manages partition 310. Partition 310 includes metadata 312 which is stored using Btree 315 and journal 320. Metadata 312 is stored on chunks (325A-C, 325 Generally). Chunks 325 are stored throughout distributed data storage system 300. In most embodiments, chunks of data may include data stored in file, object, and or other data storage formats. In various embodiments, a chunk may mean a specified amount of data storage within a distributed data storage system.

Figure 4:
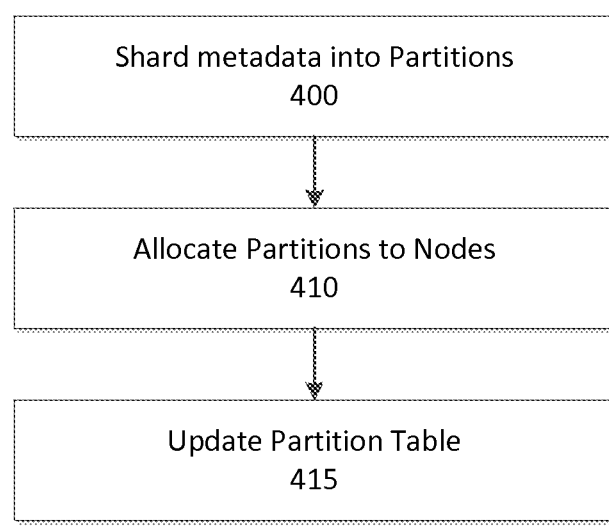
FIG. 4 is a simplified flowchart of a method of distributing metadata in a distributed data storage system, in accordance with an embodiment of the present disclosure.

Refer to the example embodiments of FIGS. 2 and 4. FIG. 4 is a simplified flowchart of a method of distributing metadata in a distributed data storage system, in accordance with an embodiment of the present disclosure. As shown, distributed data storage system 200 includes zone 205A. Zone 205A includes nodes (210A-D, 210 Generally). Partitions 215, 220, 225, 230, 240 contain metadata for data stored in Zone 205. Metadata is sharded by hashing the metadata into Partitions 215, 220, 225, 230, 240 for a random and/or even distribution of metadata across nodes 210 (Step 400) which distributes the load of managing the metadata in distributed data storage system 200. Partition 215 and partition 220 are allocated to Node 210A (Step 410). Partition 225 is allocated to Node 210B (Step 410). Partition 230 is allocated to Node 210C (Step 410). Partition 240 is allocated to Node 210D (Step 410). In this embodiment, each node 210 maintains a partition table of which partitions are managed by which nodes. Nodes 210 are in communication with each other and update partition table information (Step 415) throughout distributed data storage system 200. In most embodiments, a partition table may include information related to where a partition is located within a distributed data storage system. In various embodiments, a node managing a partition may not be in control of where the partition may be stored within the distributed data storage system. In various embodiments, partitions may be reallocated across nodes as the load of each partition changes with usage.

Figure 5:
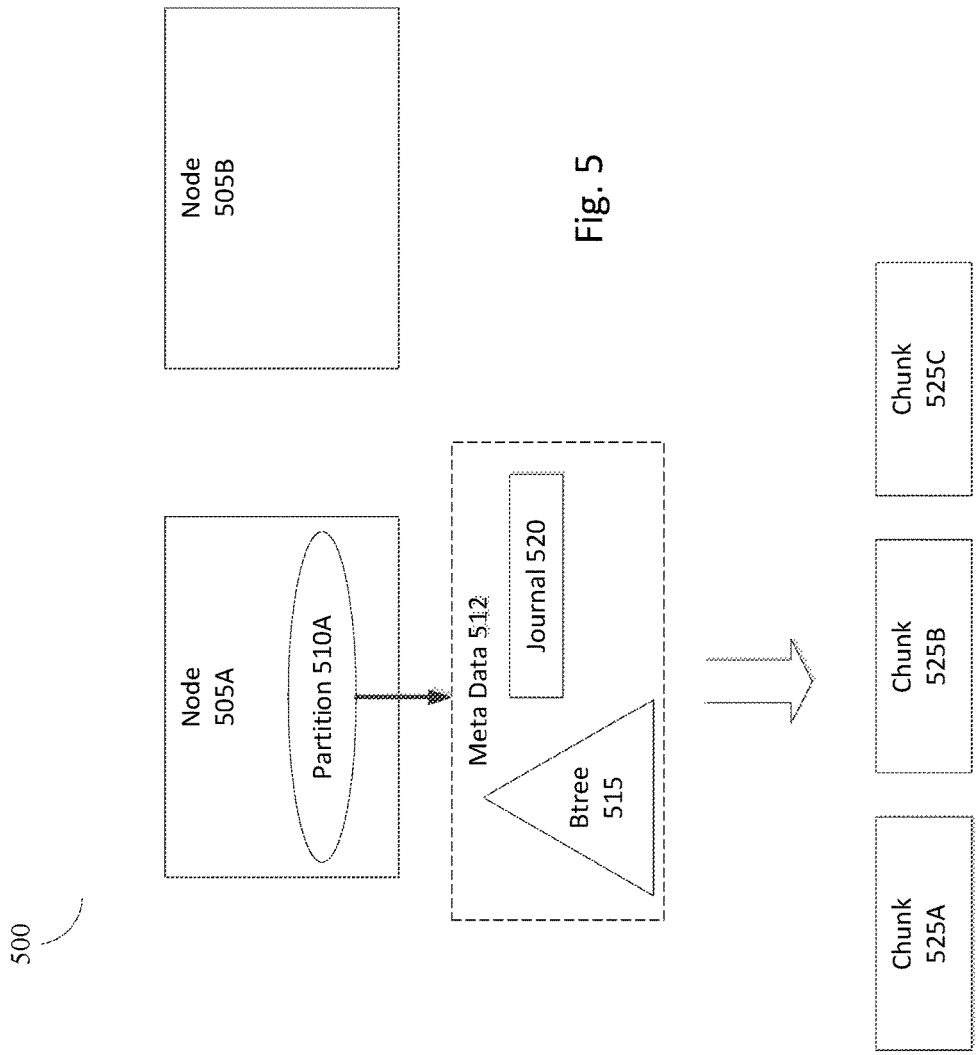
FIG. 5 is a simplified illustration of a node managing metadata within a distributed data storage system in an initial state, in accordance with an embodiment of the present disclosure.

Refer to the example embodiment of FIG. 5. FIG. 5 is a simplified illustration of a node managing metadata within a distributed data storage system in an initial state, in accordance with an embodiment of the present disclosure. As shown, the distributed data storage system 500 includes node 505A and node 505B. Node 505A is managing partition 510A which includes metadata 512. Metadata 312 is stored using Btree 515 and journal 520. Btree 515 and Journal 520 are stored on chunks 525A, 525B, 525C which are stored within distributed data storage system 500. In this embodiment, Node 505B is not managing a partition of metadata.

Figure 6:
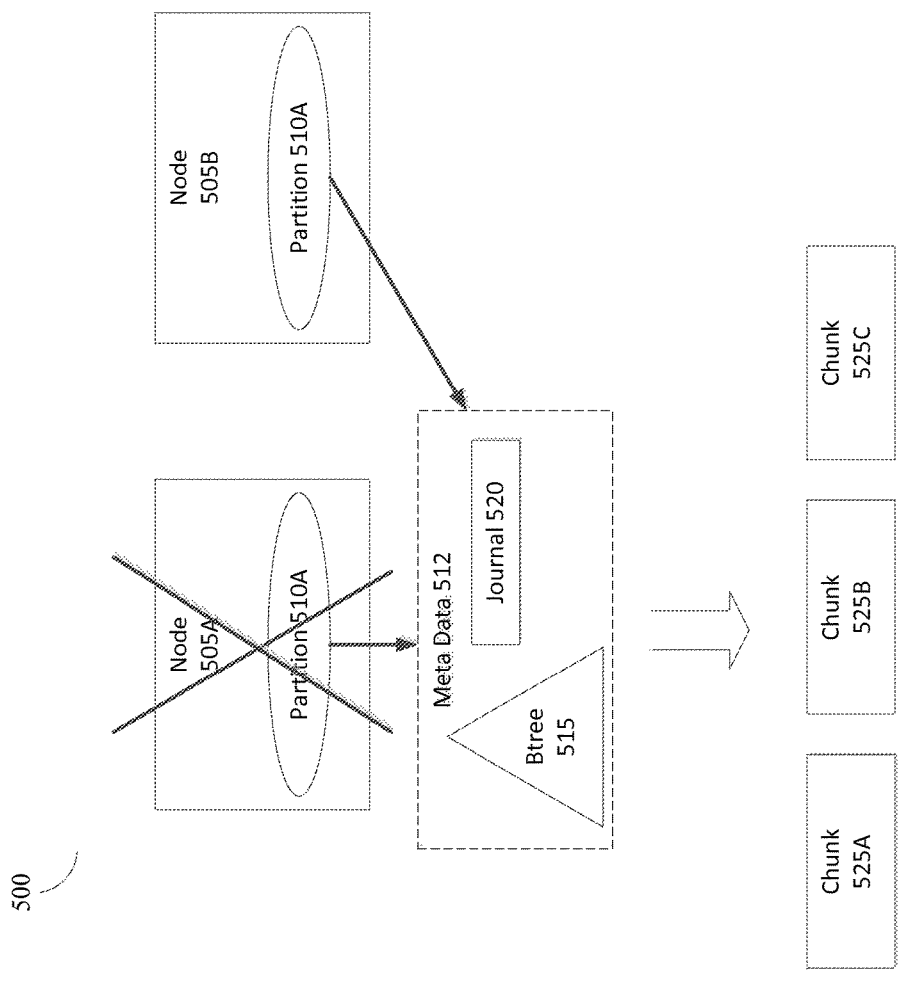
FIG. 6 is a simplified illustration of managing metadata during a node failover state in a distributed data storage system, in accordance with an embodiment of the present disclosure.

Refer to the example embodiment of FIG. 6. FIG. 6 is a simplified illustration of managing metadata during a node failover state in a distributed data storage system, in accordance with an embodiment of the present disclosure. As shown, node 505A is managing partition 510A and is experiencing a failover event where node 505A is failing. Upon detecting a failover event, distributed data storage system 500 tasks Node 505B to manage partition 510A. In this embodiment, as chunks 525A, 525B, 525C are not stored on Node 505A. Node 505B is enabled to quickly respond to requests to partition 510A without movement of metadata 512.

Figure 7:
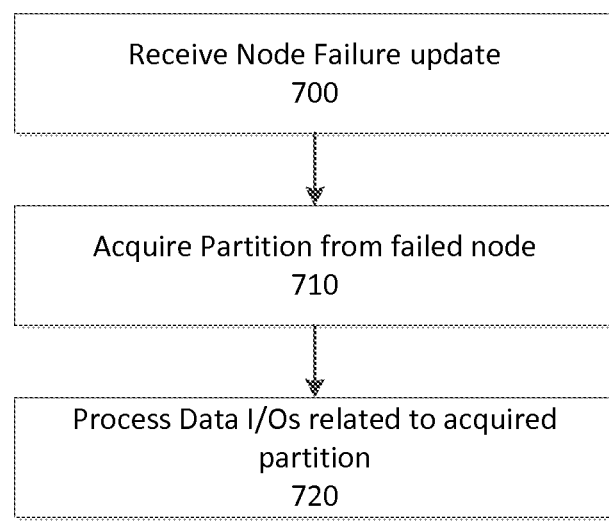
FIG. 7 is a simplified flowchart of a failover event in a distributed data storage system shown in FIG. 6, in accordance with an embodiment of the present disclosure.

Refer to the example embodiments of FIGS. 6 and 7. FIG. 7 is a simplified flowchart of a failover event in a distributed data storage system shown in FIG. 6, in accordance with an embodiment of the present disclosure. As shown, node 505A is managing partition 510A and is experiencing a failover event where node 505A is failing. Node 505B receives node failure message from distributed data storage system 500 (Step 700). Node 505B acquires control over partition 510A from node 505A (Step 710) and processes data I/O requests related to partition 510A (Step 720).

Figure 8:
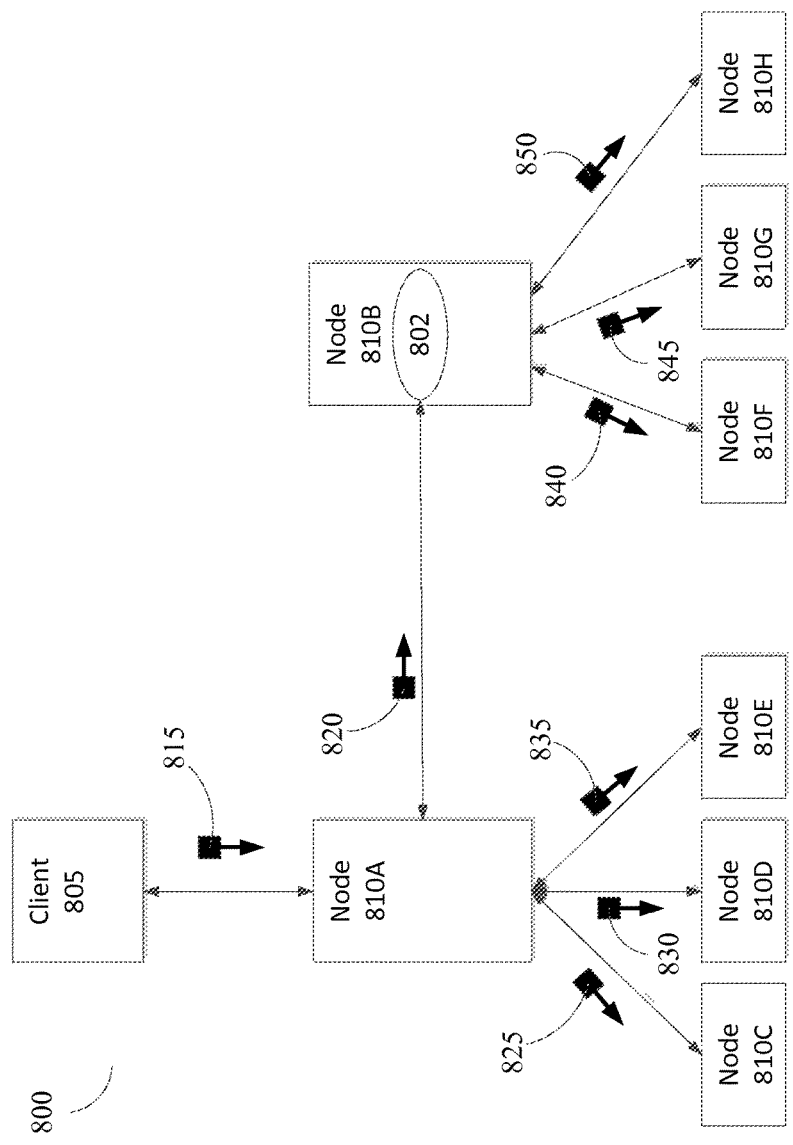
FIG. 8 is a simplified illustration of distribute data storage system managing data, in accordance with an embodiment of the present disclosure.

Refer to the example embodiment of FIG. 8. FIG. 8 is a simplified illustration of distribute data storage system managing data, in accordance with an embodiment of the present disclosure. As shown, the distributed data storage system includes Nodes (810A-H, 810 Generally). Client 805 is interacting with data storage on the distributed data storage system 800. Client 805 sends a data I/O write request in message 815 to Node 810A which writes the received data I/O to Node 810C using message 825, Node 810D using message 830, and Node 810E using message 835. Node 810A sends a metadata update to partition 802 on Node 810B using message 820. Metadata contained within partition 802 is stored using node 810F, node 810G, and node 810H. Node 810B sends metadata to Node 810F using message 840. Node 810B sends metadata to Node 810G using message 845. Node 810B sends metadata to Node 810H using message 850.

Figure 9:
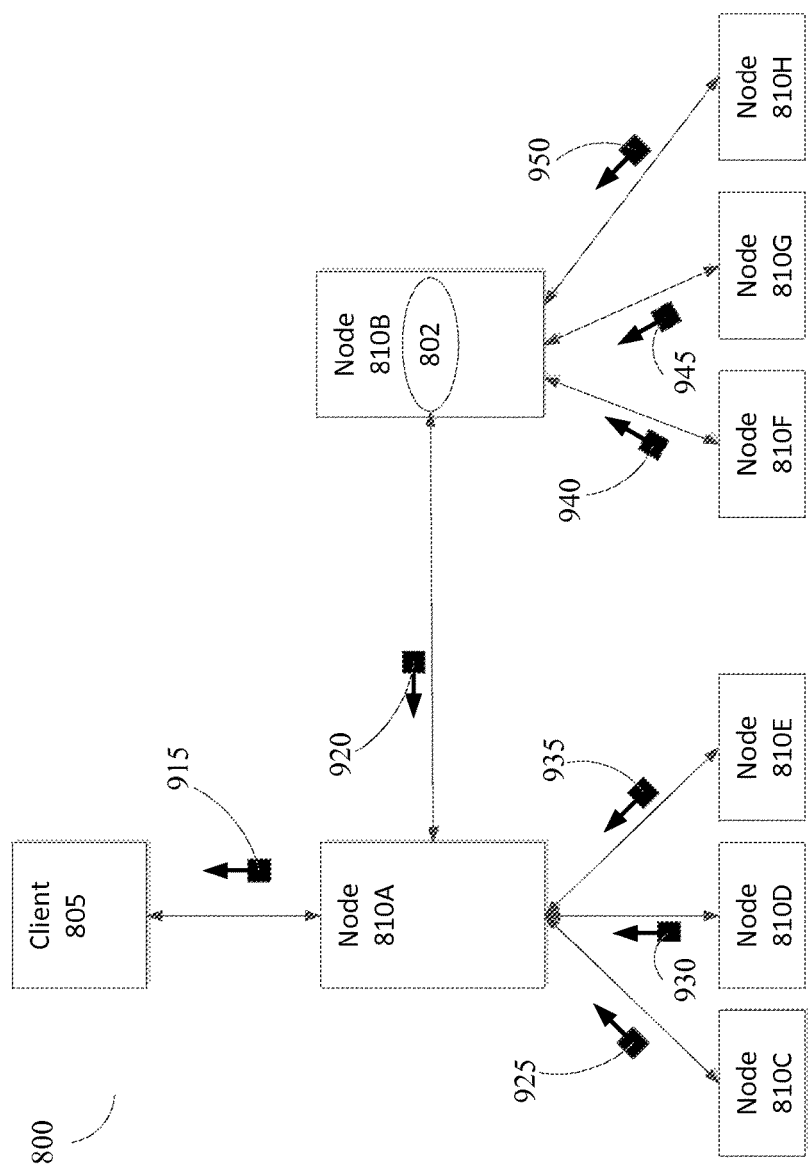
FIG. 9 is a simplified illustration of a distributed data storage system managing data, in accordance with an embodiment of the present disclosure.

Refer to the example embodiment of FIG. 9. FIG. 9 is a simplified illustration of a distributed data storage system managing data, in accordance with an embodiment of the present disclosure. As shown, Nodes 810F, 810G, 810H are sending acknowledgement messages 940, 945, 950 to node 810B acknowledging receipt of metadata and that received metadata was written within distributed data storage system 800. Nodes 810C, 810D, 810E send acknowledgment messages 925, 930, 935 to node 810A acknowledging that received I/O requests have been processed within distributed data storage system 800. Once Node 810B receives acknowledgement messages from nodes 810F, 810G, 810H, Node 810B sends an acknowledgment to node 810A using message 920. When node 810A receives messages 925, 930, 935, 920, Node 810 determines that all acknowledgement messages have been received as sends an I/O request acknowledgment using message 915.

Figure 10:
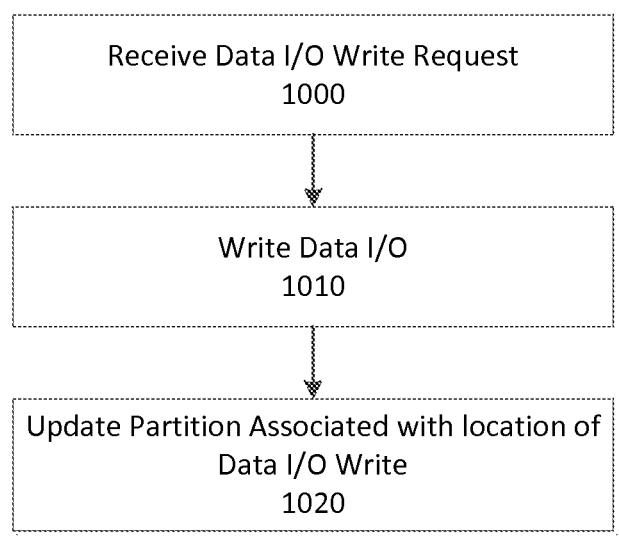
FIG. 10 is a simplified illustration of a distributed data storage system managing data, in accordance with an embodiment of the present disclosure.

Refer to the example embodiments of FIGS. 8 and 10. FIG. 10 is a simplified illustration of a distributed data storage system managing data, in accordance with an embodiment of the present disclosure. As shown in FIG. 8, distributed data storage system 800 includes Nodes (810A-H, 810 Generally). Client 805 is interacting with data storage on distributed data storage system 800. Node 810A receives a data I/O write request (Step 1000) from client 805 in message 815. Node 810A writes the received data I/O to node 810C, node 810D, and Node 810E (Step 1010). Node 810A sends a metadata update to partition 802 manage by node 810B (Step 1020), which stores the metadata on Node 810F, node 810G, and Node 810H.

Figure 11:
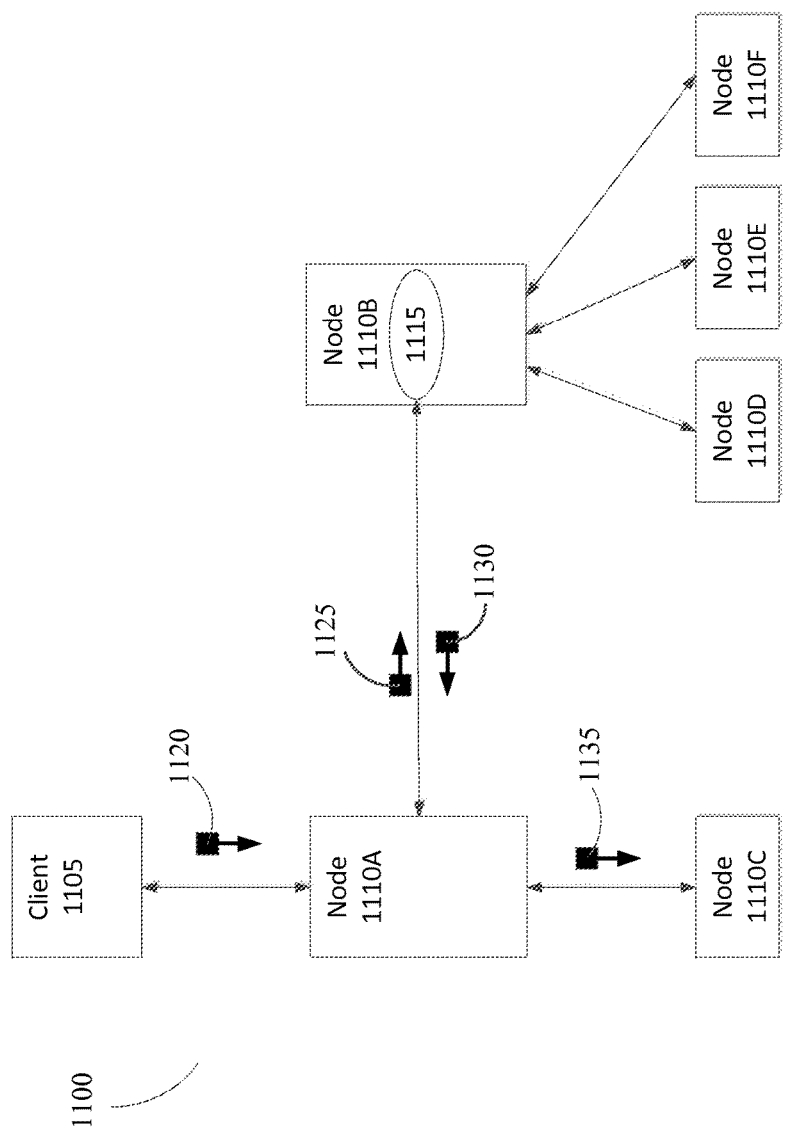
FIG. 11 is a simplified illustration of a distributed data storage system managing a data I/O read request, in accordance with an embodiment of the present disclosure.

Refer to the example embodiment of FIG. 11. FIG. 11 is a simplified illustration of a distributed data storage system managing a data I/O read request, in accordance with an embodiment of the present disclosure. As shown, distributed data storage system 1100 includes nodes (1110A-F, 1110 Generally). Node 1110B includes partition 1115 which is used to manage a portion of metadata within distributed data storage system 1100. the Portion of metadata managed using partition 1115 is stored using Node 1110D, Node 1110E, and Node 1110F. In this embodiment, Client 1105 sends a data I/O read request to Node 1110A using message 1120. Node 1110A determines that the data I/O read request is related to metadata that Node 1110B manages in partition 1115. Node 1110A sends a request, using message 1125, to Node 1110B to query metadata in Partition 1115 for information related to the received data I/O read request. Node 1110B determines where the requested data I/O is stored and returns related metadata to Node 1110A using message 1130. Node 1110A utilizes received metadata to locate and retrieve requested data from node 1110C using message 1135.

Figure 12:
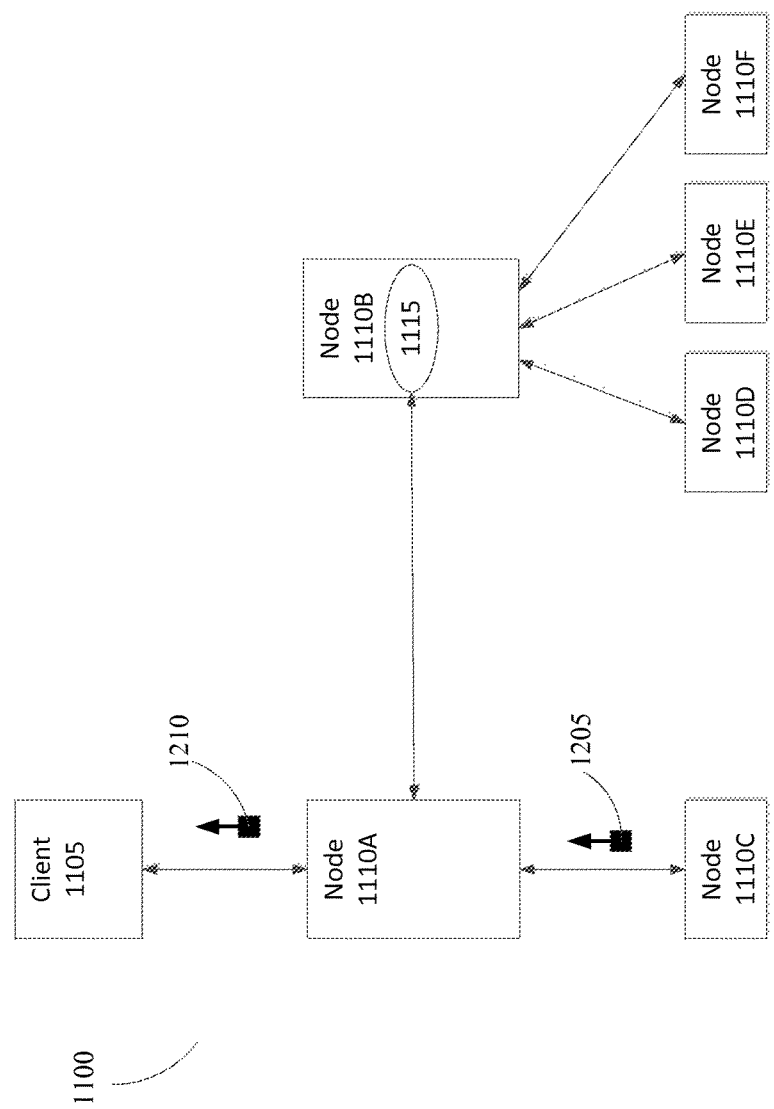
FIG. 12 is a simplified illustration of a distributed data storage system managing a data I/O read request, in accordance with an embodiment of the present disclosure.

Refer to the example embodiment of FIG. 12. FIG. 12 is a simplified illustration of a distributed data storage system managing a data I/O read request, in accordance with an embodiment of the present disclosure. As shown, Node 1110C retrieves requested data I/O and sends the data I/O to Node 1110A using message 1205. Node 1110A responds to Client 1105 data I/O request and forwards the requested data using message 1210.

Figure 13:
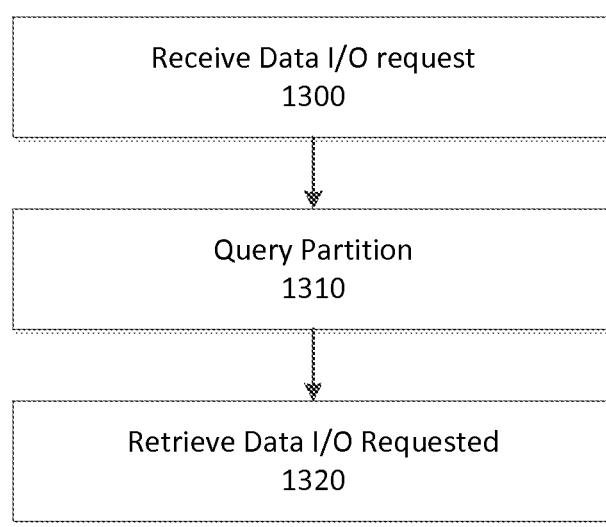
FIG. 13 is a simplified flowchart of a method of managing a data I/O read request, in accordance with an embodiment of the present disclosure.

Refer to the example embodiments of FIGS. 11 and 13. FIG. 13 is a simplified flowchart of a method of managing a data I/O read request, in accordance with an embodiment of the present disclosure. As shown, distributed data storage system 1100 includes Nodes (1110A-F, 1110 Generally). Node 1110A receives data I/O request from Client 1105 (Step 1300). Node 1110A sends a request to Node 1110B to query metadata in partition 1115 (Step 1310). Node 1110B determines where the requested data I/O is stored and returns the metadata to node 1110A. Node 1110A takes the received metadata and sends the request for the data I/O to node 1110C which retrieves requested data I/O (Step 1320) and sends retrieved data I/O to Node 1110A. Upon receipt of data I/O, Node 1110A responds to the original data I/O request with the retrieved data I/O.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 14:
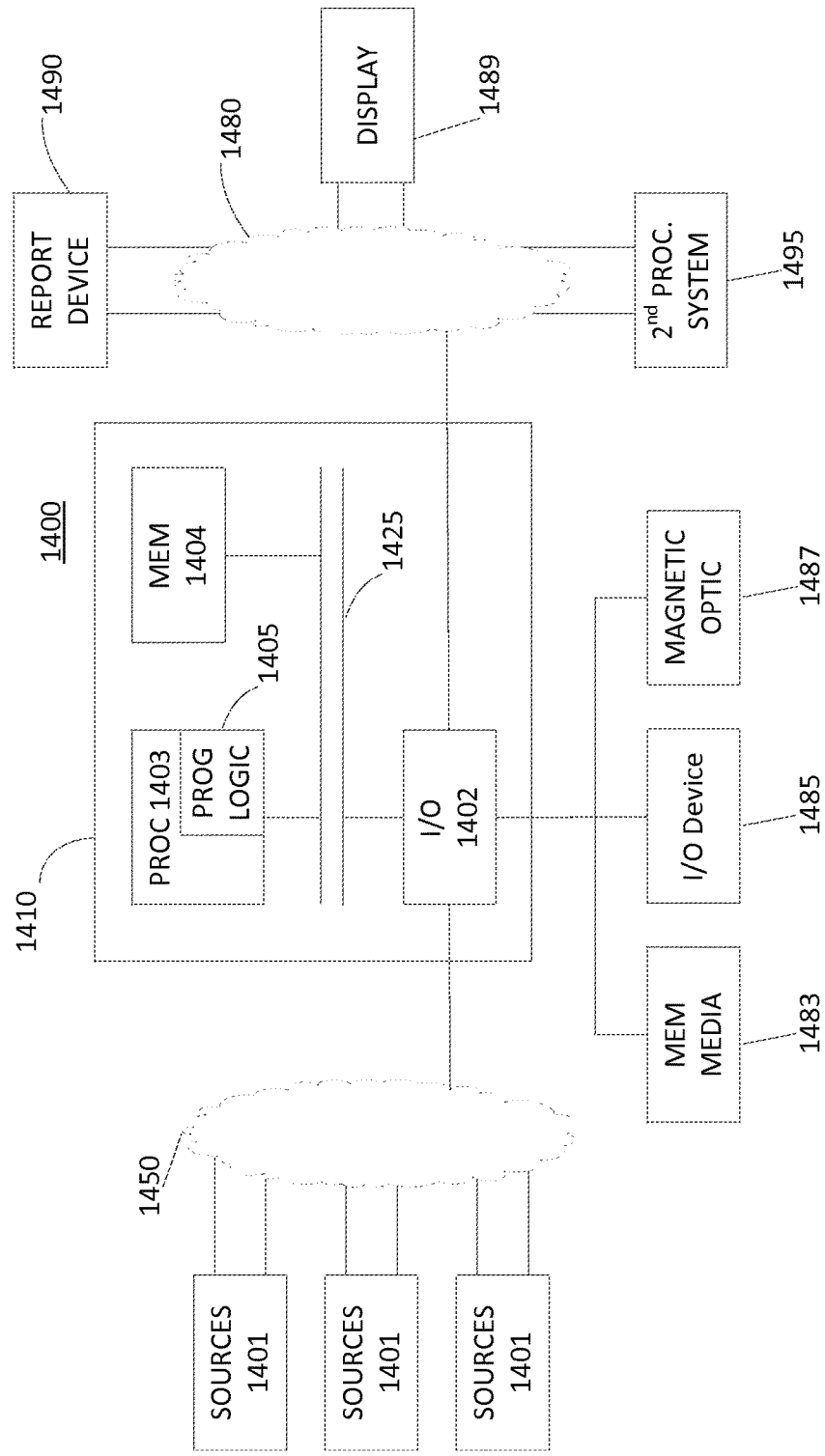
FIG. 14 is an example of an embodiment of an apparatus that may utilize the techniques described herein, in accordance with an embodiment of the present disclosure.

FIG. 14 is a block diagram illustrating an apparatus, such as a computer 1410 in a network 1400, which may utilize the techniques described herein according to an example embodiment of the present invention. The computer 1410 may include one or more I/O ports 1402, a processor 1403, and memory 1404, all of which may be connected by an interconnect 1425, such as a bus. Processor 1403 may include program logic 1405. The I/O port 1402 may provide connectivity to memory media 1483, I/O devices 1485, and drives 1487, such as magnetic or optical drives. When the program code is loaded into memory 704 and executed by the computer 1410, the machine becomes an apparatus for practicing the invention. When implemented on one or more general-purpose processors 1403, the program code combines with such a processor to provide a unique apparatus that operates analogously to specific logic circuits. As such, a general purpose digital machine can be transformed into a special purpose digital machine.

Figure 15:
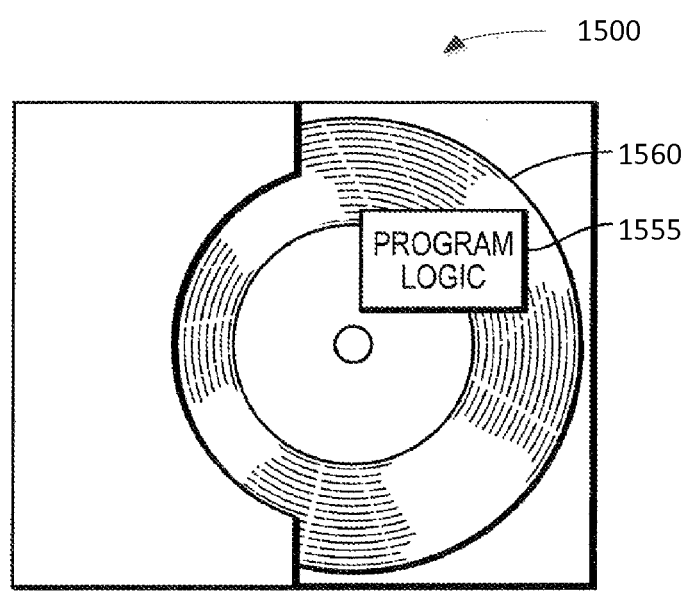
FIG. 15 is an example of a method embodied on a computer readable storage medium that may utilize the techniques described herein, in accordance with an embodiment of the present disclosure.

FIG. 15 is a block diagram illustrating a method embodied on a computer readable storage medium 1560 that may utilize the techniques described herein according to an example embodiment of the present invention. FIG. 15 shows Program Logic 1555 embodied on a computer-readable medium 1560 as shown, and wherein the Logic is encoded in computer-executable code configured for carrying out the methods of this invention and thereby forming a Computer Program Product 1500. Program Logic 1555 may be the same logic 1405 on memory 1404 loaded on processor 1403 in FIG. 14. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-15. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing metadata in a distributed data storage system, wherein the distributed data storage system includes a first node of a plurality of nodes and one or more data storage arrays, the computer-executable method comprising:

partitioning management of metadata created in the distributed data storage system into one or more portions of metadata, wherein the first node manages a first portion of the one or more portions of metadata, using one or more processors and memory;

wherein each of the plurality of nodes manages one or more portions of the metadata;

wherein each of the plurality of nodes includes a table storing which node of the plurality of nodes manages each of the one or more portions of metadata;

storing the metadata using the first node;

periodically analyzing a load balance of metadata management, using one or more processors and memory available to the distributed data storage system, by each of the one or more nodes; and dynamically rebalancing the partitioning of metadata throughout the distributed data storage system based on the analysis matching changes to the distributed data storage system;

upon receipt, at a second node of the plurality of nodes, of notice that the first node has failed, acquiring management of the first portion of one or more portions of the metadata; wherein the storing comprises: providing a metadata storage structure including a first portion and a second portion, where in received metadata is combined with the second portion; periodically updating the first portion from the second portion; and removing portions of the second portions used to update the first portion, wherein the first portion of the metadata storage is a b-tree.

2. The computer-executable method of claim 1, wherein the metadata storage structure is stored using the second node in the distributed data storage system.

3. The computer-executable method of claim 1, wherein the partitioning the management of metadata is hashing the metadata into the one or more portions of metadata.

4. The computer-executable method of claim 1, further comprising:

analyzing a distribution of the one or more portions of metadata; and modifying the distribution of the one or more portions of metadata based on a load of each node in the distributed data storage system.

5. A system, comprising:
a distributed data storage system including a first node and one or more data storage arrays; and
computer-executable program logic encoded in memory of one or more computers in communication with the distributed data storage system to enable management of metadata within the distributed data storage system, wherein the computer-executable program logic is configured for the execution of:
partitioning management of metadata created in the distributed data storage system into one or more portions of metadata, wherein the first node manages a first portion of the one or more portions of metadata;
wherein each of the plurality of nodes manages one or more portions of the metadata;
wherein each of the plurality of nodes includes a table storing which node of the plurality of nodes manages each of the one or more portions of metadata;
storing the metadata using the first node;
periodically analyzing a load balance of metadata management, using one or more processors and memory available to the distributed data storage system, by each of the one or more nodes; and
dynamically rebalancing the partitioning of metadata throughout the distributed data storage system based on the analysis matching changes to the distributed data storage system;
upon receipt, at a second node of the plurality of nodes, of notice that the first node has failed, acquiring management of the first portion of one or more portions of the metadata; wherein the storing comprises: providing a metadata storage structure including a first portion and a second portion, wherein received metadata is combined with the second portion; periodically updating the first portion from the second portion; and removing portions of the second portions used to update the first portion, wherein the first portion of the metadata storage is a b-tree.

6. The system of claim 5, wherein the metadata storage structure is stored using the second node in the distributed data storage system.

7. The system of claim 5, wherein the partitioning the management of metadata is hashing the metadata into the one or more portions of metadata.

8. The system of claim 5, wherein the computer-executable program logic is further configured for the execution of:
analyzing a distribution of the one or more portions of metadata; and
modifying the distribution of the one or more portions of metadata based on a load of each node in the distributed data storage system.

9. A computer program product for managing metadata in a distributed data storage system, wherein the distributed data storage system includes a first node and one or more data storage arrays, the computer program product comprising:
a non-transitory computer readable medium encoded with computer-executable program code for using read signatures in replication, the code configured to enable the execution of:
partitioning management of metadata created in the distributed data storage system into one or more portions of metadata, wherein the first node manages a first portion of the one or more portions of metadata;
wherein each of the plurality of nodes manages one or more portions of the metadata;
wherein each of the plurality of nodes includes a table storing which node of the plurality of nodes manages each of the one or more portions of metadata;
storing the metadata using the first node;
periodically analyzing a load balance of metadata management, using one or more processors and memory available to the distributed data storage system, by each of the one or more nodes; and
dynamically rebalancing the partitioning of metadata throughout the distributed data storage system based on the analysis matching changes to the distributed data storage system;
upon receipt, at a second node of the plurality of nodes, of notice that the first node has failed, acquiring management of the first portion of one or more portions of the metadata; wherein the storing comprises: providing a metadata storage structure including a first portion and a second portion, wherein received metadata is combined with the second portion; periodically updating the first portion from the second portion; and removing portions of the second portions used to update the first portion, wherein the first portion of the metadata storage is a b-tree.

10. The computer program product of claim 9, wherein the metadata storage structure is stored using the second node in the distributed data storage system.

11. The computer program product of claim 9, wherein the partitioning the management of metadata is hashing the metadata into the one or more portions of metadata.

12. The computer program product of claim 9, wherein the code is further configured to enable the execution of:
analyzing a distribution of the one or more portions of metadata; and
modifying the distribution of the one or more portions of metadata based on a load of each node in the distributed data storage system.

* * * * *